United States Patent
Cui et al.

(10) Patent No.: US 9,790,443 B2
(45) Date of Patent: Oct. 17, 2017

(54) VERTICAL PYROLYSIS REACTOR WITH PRECISE CONTROL

(71) Applicant: Suzhou GreenGen Tech Energy Inc., Suzhou SIP, Jiangsu (CH)

(72) Inventors: Maopei Cui, Ottawa (CA); Huiyan Lv, Taicang (CH); Linjun Zhu, Suzhou SIP (CH)

(73) Assignee: Suzhou GreenGen Tech Energy Inc., Suzhou, SIP, Jinagsu (CN)

( * ) Notice: Subject to any disclaimer, the term of this patent is extended or adjusted under 35 U.S.C. 154(b) by 544 days.

(21) Appl. No.: 14/481,430

(22) Filed: Sep. 9, 2014

(65) Prior Publication Data

US 2016/0068757 A1    Mar. 10, 2016

(51) Int. Cl.
*C10J 3/30* (2006.01)
*C10J 3/42* (2006.01)
*C10J 3/72* (2006.01)

(52) U.S. Cl.
CPC . *C10J 3/30* (2013.01); *C10J 3/42* (2013.01); *C10J 3/723* (2013.01); *C10J 2200/158* (2013.01); *C10J 2300/0906* (2013.01); *C10J 2300/0916* (2013.01); *C10J 2300/0956* (2013.01); *C10J 2300/1846* (2013.01); *Y02E 50/14* (2013.01)

(58) Field of Classification Search
CPC ....... C10J 3/30; C10J 3/42; C10J 3/723; C10J 2200/158; C10J 2300/1846; Y02E 50/14
USPC .................................................. 403/122, 166
See application file for complete search history.

(56) References Cited

U.S. PATENT DOCUMENTS

| 1,412,921 | A | * | 4/1922 | Chapman | C10J 3/32 110/275 |
| 4,088,455 | A | * | 5/1978 | Kohlen | C10J 3/16 48/202 |
| 4,146,369 | A | * | 3/1979 | Flesch | C10J 3/54 252/373 |
| 4,388,876 | A | * | 6/1983 | Burton | F23J 1/00 110/170 |

(Continued)

FOREIGN PATENT DOCUMENTS

| CN | 2511878 Y | 9/2002 |
| CN | 201459073 U | 5/2010 |
| CN | 101717652 B | 11/2012 |

*Primary Examiner* — Matthew Merkling
(74) *Attorney, Agent, or Firm* — The Noblitt Group, PLLC

(57) ABSTRACT

The present invention relates to a vertical pyrolysis reactor, including a reactor shell, a feeding device, a biomass gas outlet on the top of the reactor, an ash discharging device on the bottom of the reactor, and a grate inside the reactor. The feeding device is located on the bottom of the reactor, and an outlet of the feeding device is located in a central region of the bottom in the reactor for uniform material distribution. A slag breaking device is mounted in the pyrolysis reactor, forming an organic combination with the rotating grate. The output is adjustable through the operating speed of the grate. Precise control of a pyrolysis reaction is realized by controlling the feeding speed, discharging speed, material bed thickness, inlet air volume, inlet air distribution, reaction temperature, etc. Biomass having a size up to around 10 cm can be processed effectively and continuously due to the position design of the feeding device in conjunction with the use of the slag breaking device.

18 Claims, 3 Drawing Sheets

(56) References Cited

U.S. PATENT DOCUMENTS

| | | | | |
|---|---|---|---|---|
| 4,432,772 A | * | 2/1984 | Starke | C10J 3/34 |
| | | | | 110/165 R |
| 5,145,490 A | * | 9/1992 | Sadowski | C10J 3/20 |
| | | | | 48/197 R |
| 5,230,716 A | * | 7/1993 | Notestein | C10J 3/42 |
| | | | | 126/182 |
| 5,571,294 A | * | 11/1996 | Ferges | C10J 3/84 |
| | | | | 48/128 |
| 6,485,296 B1 | * | 11/2002 | Bender | C10J 3/14 |
| | | | | 110/203 |
| 2004/0107638 A1 | * | 6/2004 | Graham | C10J 3/30 |
| | | | | 48/197 FM |
| 2015/0143749 A1 | * | 5/2015 | Kong | C10J 3/06 |
| | | | | 48/101 |

* cited by examiner

VERTICAL PYROLYSIS REACTOR WITH PRECISE CONTROL

FIELD OF THE INVENTION

The present invention relates to a device for processing a material containing cellulose, and more particularly to a vertical pyrolysis reactor.

BACKGROUND

Biomass pyrolysis refers to a thermochemical conversion technical method in which biomass is heated to 250-700° C. in the absence of an oxidant (air, oxygen, water vapor, etc.) or with limited oxygen, and macromolecular substances (lignin, cellulose, and hemicellulose) of the biomass are decomposed through thermochemical reactions into micromolecular fuel substances (solid charcoal, combustible gas, and bio-oil). Analyzed from the perspective of chemical reactions, the biomass is subjected to complex thermochemical reactions, including molecular bond breakage, isomerization, small molecule polymerization, and other reactions, in the process of pyrolysis. (Zhao Tinglin, Wang Peng, Deng Dajun, et al., Research Status and Prospect of Biomass Pyrolysis [J]. Renewable Energy Industry, 2007, 5: 54-60).

Products of biomass pyrolysis are combustible pyrolysis gas and solid biomass charcoal, both of which are products available for energy application. The gas not only is used as a fuel for heat supply, but also can be further reformed as a raw material for power generation and green liquid fuel synthesis. The biomass charcoal not only serves as a fuel, but also has many additional values: it is also used as a fuel for metal smelting, food and light industry, a reducing agent for electric furnace smelting, a covering agent in metal refining for protecting the metal from oxidation, and often a raw material for carbon disulfide and active carbon in chemical industry. Since the Chinese government prohibits making charcoal by burning wood, the biochar has a vast market now.

Chinese patent CN200910225125.3 discloses a helical pyrolysis reactor, including a shell. The shell is provided with a material inlet at the center of the top end, a phyrolysis gas outlet on the sidewall on the upper end, a heat carrier outlet on the sidewall on the lower end, and a charcoal powder outlet on the bottom. The material inlet of the pyrolysis reactor is located at the center of the top end.

Chinese patent CN01270113.0 discloses a continuously operating pyrolysis device for solid organics, mainly consisting of a helical conveyor reactor, a fluidized bed gasifier, a riser regenerator, a cyclone separator, a heat exchanger, a regenerant surge bin, etc. A material inlet of the pyrolysis device is located on the top end.

Chinese patent CN200920100781.6 discloses a biomass catalytic gasifier. A gasification reactor is of a vertical type. A helical feeder is disposed on the upper part of the gasification reactor. Multiple sets of heat conducting fins are mounted on an inner wall of the gasification reactor. A residue outlet and a water vapor outlet are respectively opened on the bottom of the gasification reactor. A water vapor distribution plate is disposed on the lower part of the gasification reactor. A gasification gas outlet is disposed on the top of the gasification reactor. The feeder of the device is disposed on the upper part of the gasification reactor.

To sum up, material inlets of current biomass pyrolysis reactors are located on the upper part or at the center of the upper part of the pyrolysis reactors. However, biomass fed from the upper part is stacked into nonuniform and uneven beds, and the biomass is easily bonded or bridged during the pyrolysis reaction, affecting flowing of the biomass material in the reactor. Empty bridging easily occurs, so that ash cannot be discharged normally, further blocking the reactor. Finally, the production cannot proceed continuously.

Due to the problem of conveying and the like, the existing biomass pyrolysis reactors cannot directly process biomass having a large size around 10 cm for continuous production. Moreover, in the existing pyrolysis reactors, ash falls through the gap between the grate and the inner wall of the reactor. However, the size of the gap is unscientific in actual production: if the size is large, the biomass raw material leaks out continuously; and if the size is small, blocking occurs easily, affecting the production.

It would be advantageous to overcome some of the disadvantages of the prior art.

SUMMARY OF THE EMBODIMENTS OF THE INVENTION

In accordance with the invention there is provided a system comprising a vertical pyrolysis reactor with precise control, including a reactor shell, a feeding device, a biomass gas outlet on the top of the reactor, an ash discharging device on the bottom of the reactor, and a grate inside the reactor, characterized in that: the feeding device is located on the bottom of the reactor, and an outlet of the feeding device is located in a central region of the bottom in the reactor.

BRIEF DESCRIPTION OF THE DRAWINGS

Exemplary embodiments will now be described in conjunction with the following drawings, wherein like numerals refer to elements having similar function, in which.

DETAILED DESCRIPTION OF THE EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
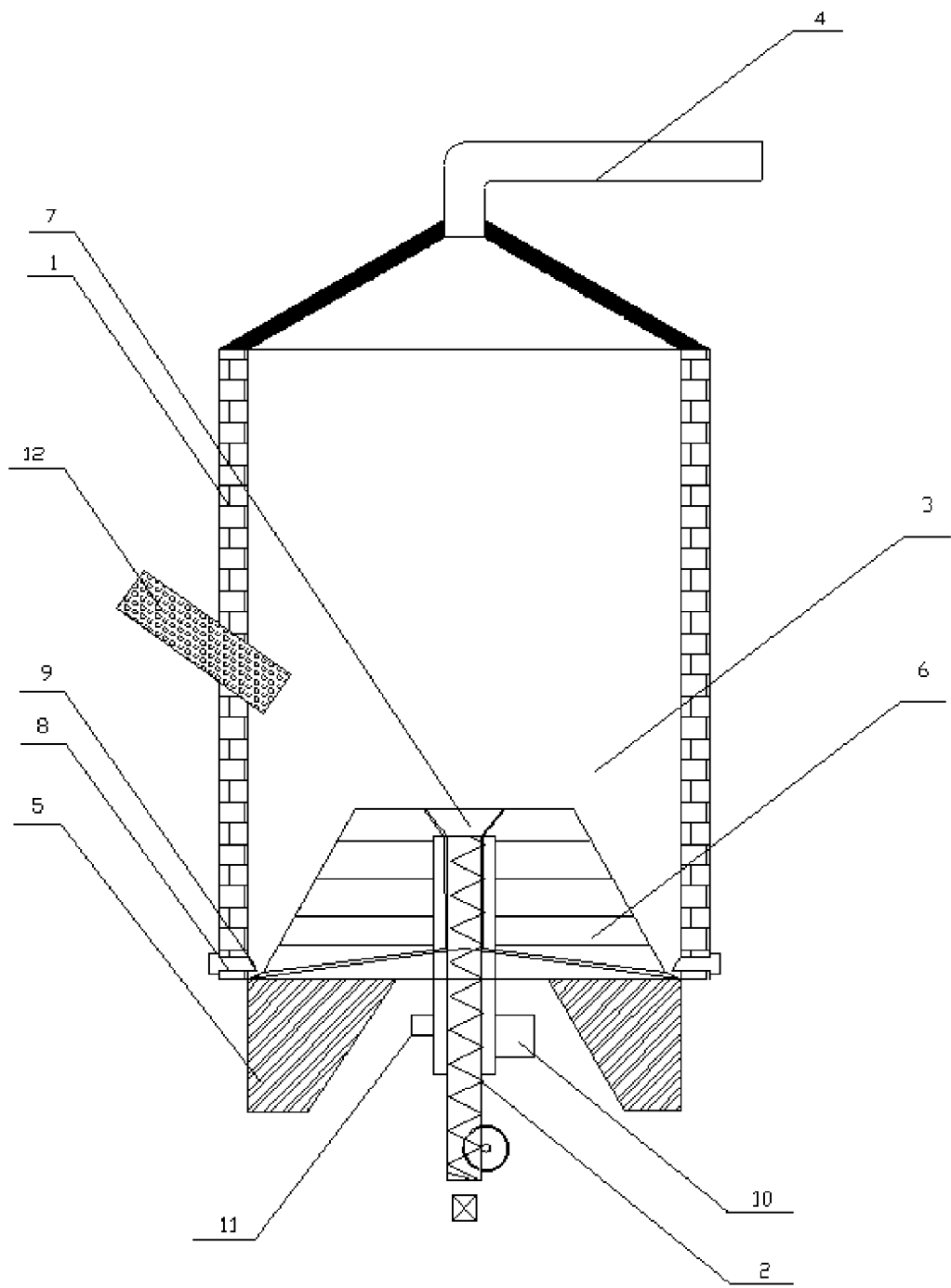
FIG. 1 is a simplified diagram of an embodiment of the invention.

Shown in FIG. 1 is a simplified diagram of a pyrolysis reactor according to an embodiment of the invention. A vertical pyrolysis reactor with precise control includes a reactor shell 1, a feeding device 2, a biomass gas outlet 4 on the top of the reactor, an ash discharging device 5 on the bottom of the reactor, in which the ash discharging device 5 has on the bottom a sealing ring for preventing gas leakage during ash discharging, and a grate 6 inside the reactor. The feeding device 2 is located on the bottom of the reactor, and an outlet 7 of the feeding device is located in a central region of the bottom in the reactor. The grate 6 is in the shape of a circular truncated cone, of which a longitudinal section is an isosceles trapezoid. The grate 6 is a structure of four layers, set to be rotatable and non-rotatable layers alternately with a gap between every two layers, in which one rotatable layer is followed by a non-rotatable layer and then another rotatable layer, ensuring that the material can be fed at the requirement of precise control when the grate rotates. The grate 6 is disposed outside the feeding device 2, and the feeding device 2 is embedded in the grate 6. An air inlet 10 is mounted on the part of the feeding device 2 protruding out of the reactor, and hot air enters from the air inlet 10. A grate rotation control device 11 is mounted on the feeding device 2 outside the reactor. Slag breaking devices 8 are symmetrically mounted on an inner wall of the reactor shell 1, and the slag breaking device 8 has a cutting portion 9 protruding from the inner wall of the reactor shell 1. A longitudinal section of the cutting portion 9 of the slag breaking device 8 is a triangle. The slag breaking device 8 is an ash discharging tongue, which is a castable having a cross section being a trapezoid, and is fixedly mounted at the bottom of the reactor shell 1, near the ash discharging device 5, and forming a gap with the bottom of the grate 6. When a biomass raw material is straw of less than 10 cm, the gap formed between the slag breaking device 8 and the bottom of the grate 6 is 4 cm. An arch breaking device 12 is mounted throughout the wall of the reactor and 20 cm above the grate, and is a rectangular block of a hard material. Biomass is easily caked when being burnt, and the cake can be broken by the arch breaking device.

During operation of the vertical pyrolysis reactor, the rotation speed of the grate can be controlled precisely by the grate rotation control device 11, so as to control the thickness of the biomass material beds 3 precisely; meanwhile, the reaction temperature and inlet air volume in the pyrolysis reactor can be controlled by controlling the volume and temperature of air entered from the air inlet 10.

Figure 2:
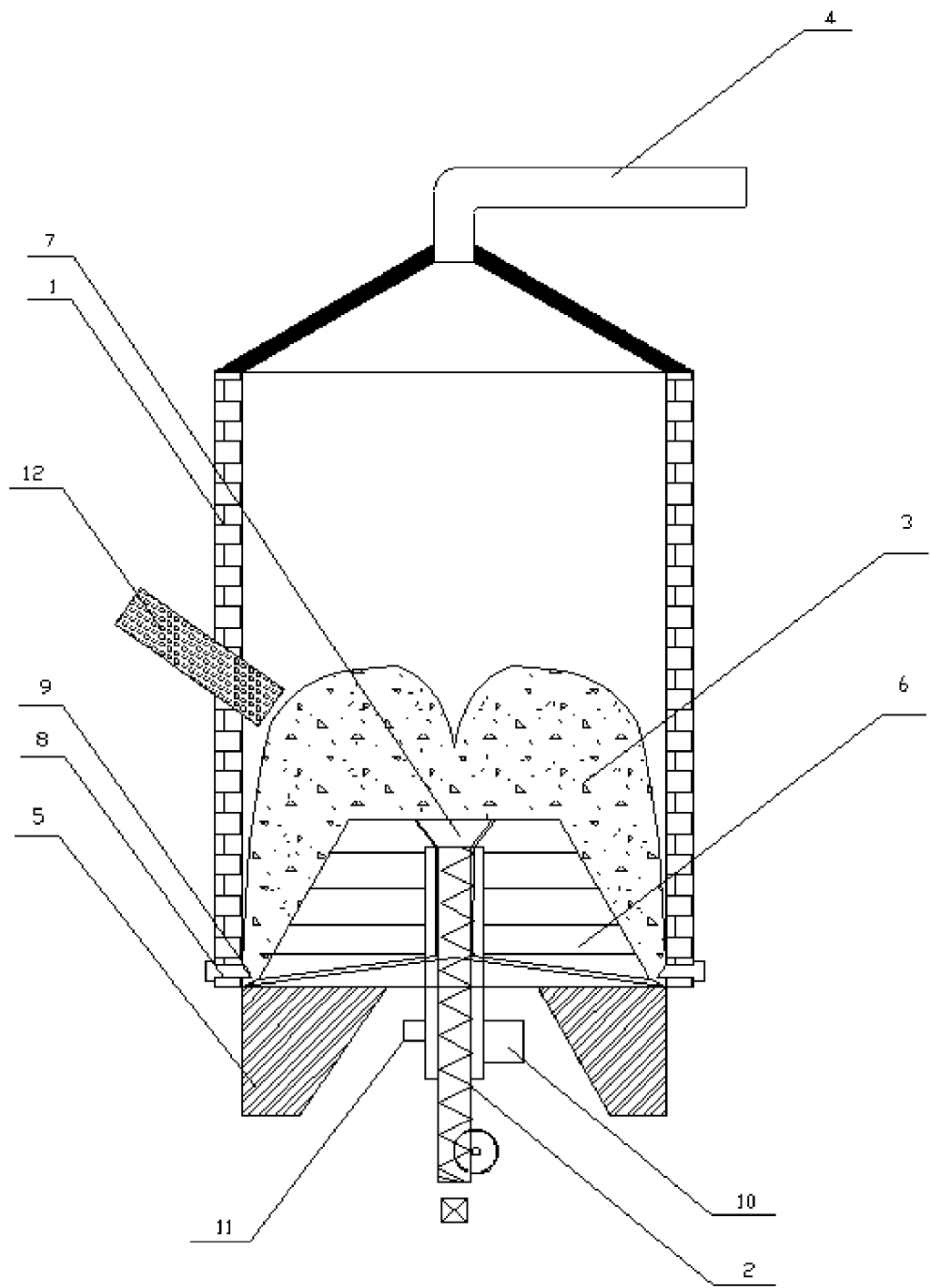
FIG. 2 is a simplified diagram of an embodiment of the invention when a material is fed.

Shown in FIG. 2 is a simplified diagram of another pyrolysis reactor according to an embodiment of the invention. A vertical pyrolysis reactor with precise control includes a reactor shell 1, a feeding device 2, a biomass gas outlet 4 on the top of the reactor, an ash discharging device 5 on the bottom of the reactor, in which the ash discharging device 5 has on the bottom a sealing ring for preventing gas leakage during ash discharging, and a grate 6 inside the reactor. The feeding device 2 is located on the bottom of the reactor, and an outlet 7 of the feeding device is located in a central region of the bottom in the reactor. The grate 6 is in the shape of a circular truncated cone, of which a longitudinal section is an isosceles trapezoid. The grate 6 is a structure of four layers, set to be rotatable and non-rotatable layers alternately with a gap between every two layers. The grate 6 is disposed outside the feeding device 2, and the feeding device 2 is embedded in the grate 6. An air inlet 10 is mounted on the part of the feeding device 2 protruding out of the reactor, and hot air enters from the air inlet 10. A grate rotation control device 11 is mounted on the feeding device 2 outside the reactor. Slag breaking devices 8 are symmetrically mounted on an inner wall of the reactor shell 1, and the slag breaking device 8 has a cutting portion 9 protruding from the inner wall of the reactor shell 1. A longitudinal section of the cutting portion 9 of the slag breaking device 8 is a triangle. The slag breaking device 8 is an ash discharging tongue, which is a castable having a cross section being a trapezoid, and is fixedly mounted at the bottom of the reactor shell 1, near the ash discharging device 5, and forming a gap with the bottom of the grate 6. When a biomass raw material is straw of less than 10 cm, the gap formed between the slag breaking device 8 and the bottom of the grate 6 is 4 cm. An arch breaking device 12 is mounted throughout the wall of the reactor and 20 cm above the grate, and is a rectangular block of a hard material. Biomass is easily caked when being burnt, and the cake can be broken by the arch breaking device.

During operation of the vertical pyrolysis reactor, the rotation speed of the grate can be controlled precisely by the grate rotation control device 11, so as to control the thickness of the biomass material beds 3 precisely; meanwhile, the reaction temperature and inlet air volume in the pyrolysis reactor can be controlled by controlling the volume and temperature of air entered from the air inlet 10.

Figure 3:
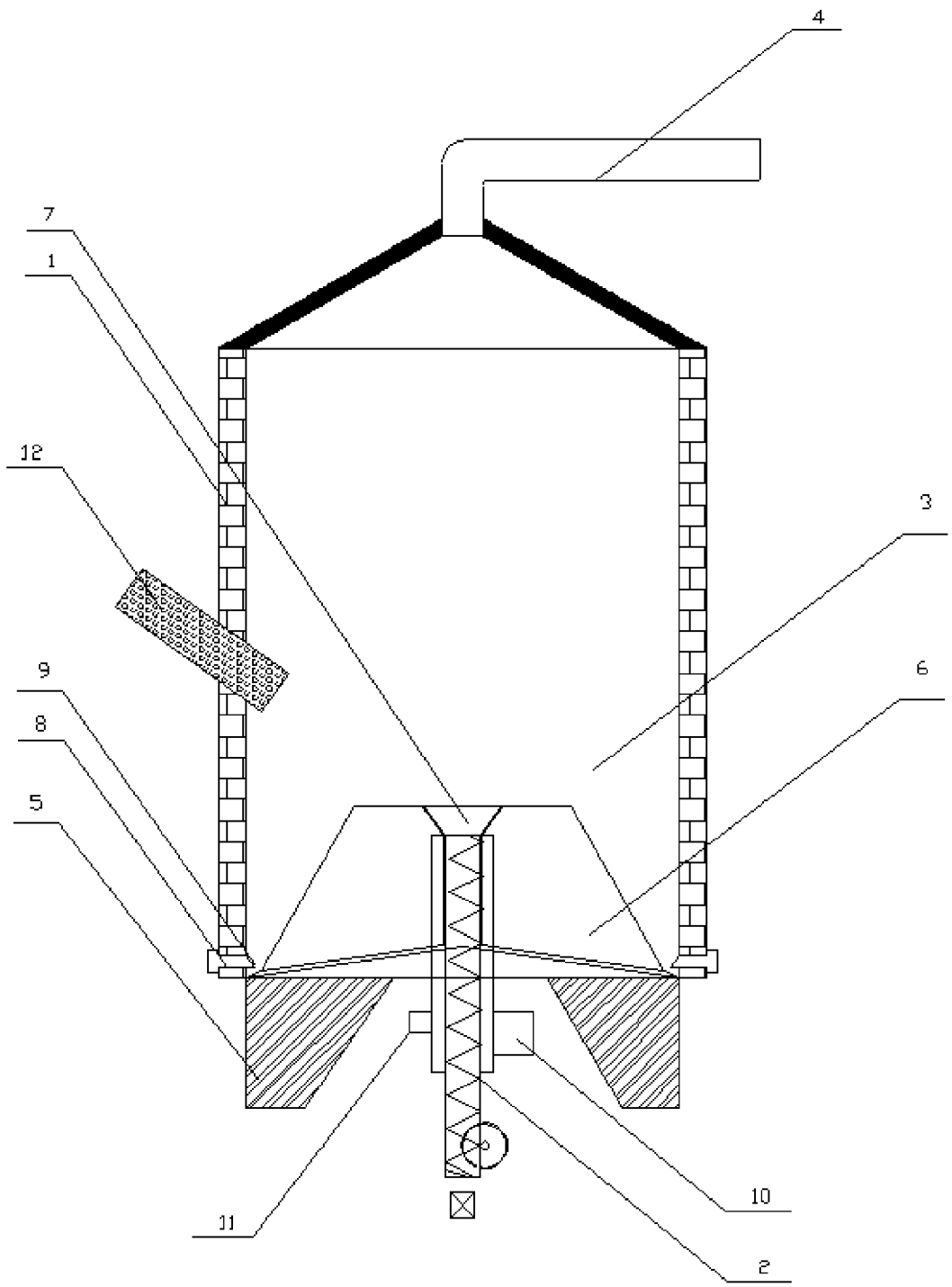
FIG. 3 is a simplified diagram of an embodiment of the invention.

Shown in FIG. 3 is a simplified diagram of another pyrolysis reactor according to an embodiment of the invention. A vertical pyrolysis reactor with precise control includes a reactor shell 1, a feeding device 2, a biomass gas outlet 4 on the top of the reactor, an ash discharging device 5 on the bottom of the reactor, in which the ash discharging device 5 has on the bottom a sealing ring for preventing gas leakage during ash discharging, and a grate 6 inside the reactor. The feeding device 2 is located on the bottom of the reactor, and an outlet 7 of the feeding device is located in a central region of the bottom in the reactor. The grate 6 has an overall structure in the shape of a circular truncated cone, of which a longitudinal section is an isosceles trapezoid. The grate 6 is disposed outside the feeding device 2, and the feeding device 2 is embedded in the grate 6. An air inlet 10 is mounted on the part of the feeding device 2 protruding out of the reactor, and hot air enters from the air inlet 10. A grate rotation control device 11 is mounted on the feeding device 2 outside the reactor. Slag breaking devices 8 are symmetrically mounted on an inner wall of the reactor shell 1, and the slag breaking device 8 has a cutting portion 9 protruding from the inner wall of the reactor shell 1. A longitudinal section of the cutting portion 9 of the slag breaking device 8 is a triangle. The slag breaking device 8 is an ash discharging tongue, which is a castable having a cross section being a trapezoid, and is fixedly mounted at the bottom of the reactor shell 1, near the ash discharging device 5, and forming a gap with the bottom of the grate 6. When a biomass raw material is straw of less than 10 cm, the gap formed between the slag breaking device 8 and the bottom of the grate 6 is 6 cm. An arch breaking device 12 is mounted throughout the wall of the reactor and 20 cm above the grate, and is a rectangular block of a hard material. Biomass is easily caked when being burnt, and the cake can be broken by the arch breaking device.

Biomass charcoal with different carbon contents can be produced through the pyrolysis reactor with precise control, and has a wide range of uses as a single product. The biomass charcoal has a relatively large volume, and needs to be cooled by the ash discharging device having a water cooling jacket fixed thereto.

During operation of the vertical pyrolysis reactor, the rotation speed of the grate can be controlled precisely by the grate rotation control device 11, so as to control the output and thus control the thickness of the biomass material precisely; meanwhile, the reaction temperature and inlet air volume in the pyrolysis reactor can be controlled by controlling the volume and temperature of air entered from the air inlet 10.

The embodiments presented are exemplary only and persons skilled in the art would appreciate that variations to the embodiments described above may be made without departing from the scope of the invention.

What is claimed is:

1. A vertical pyrolysis reactor with precise control, including a reactor shell (1), a feeding device (2), a biomass gas outlet (4) on the top of the reactor, an ash discharging device (5) on the bottom of the reactor, and a grate (6) inside the reactor, wherein the feeding device (2) is located on the bottom of the reactor, and an outlet (7) of the feeding device is located in a central region of the bottom in the reactor, wherein slag breaking devices (8) are symmetrically mounted on an inner wall of the reactor shell (1), and the slag breaking device (8) has a cutting portion (9) protruding from the inner wall of the reactor shell (1); and an arch breaking device (12) is fixedly mounted on the reactor shell (1) and above the grate (6).

2. The vertical pyrolysis reactor with precise control according to claim 1, wherein the grate (6) is in the shape of a circular truncated cone, of which a longitudinal section is an isosceles trapezoid, the grate (6) is disposed outside the feeding device (2), and the feeding device (2) is embedded in the grate (6).

3. The vertical pyrolysis reactor with precise control according to claim 1, wherein a longitudinal section of the cutting portion (9) of the slag breaking device (8) is a triangle.

4. The vertical pyrolysis reactor with precise control according to claim 3, wherein the slag breaking device (8) is fixedly mounted at the bottom of the reactor shell (1), near the ash discharging device (5), and forming a gap with the bottom of the grate (6).

5. The vertical pyrolysis reactor with precise control according to claim 4, wherein the slag breaking device (8) is an ash discharging tongue, which is a cast block having a cross section being a trapezoid.

6. The vertical pyrolysis reactor with precise control according to claim 4, wherein the gap formed between the slag breaking device (8) and the bottom of the grate (6) is designed to be 2-15 cm according to different biomass raw materials.

7. The vertical pyrolysis reactor with precise control according to claim 4, wherein when a biomass raw material is straw of less than 10 cm, the gap formed between the slag breaking device (8) and the bottom of the grate (6) is 4-8 cm.

8. The vertical pyrolysis reactor with precise control according to claim 2, wherein a longitudinal section of the cutting portion (9) of the slag breaking device (8) is a triangle.

9. The vertical pyrolysis reactor with precise control according to claim 8, wherein the slag breaking device (8) is fixedly mounted at the bottom of the reactor shell (1), near the ash discharging device (5), and forming a gap with the bottom of the grate (6).

10. The vertical pyrolysis reactor with precise control according to claim 9, wherein the slag breaking device (8) is an ash discharging tongue, which is a cast block having a cross section being a trapezoid.

11. The vertical pyrolysis reactor with precise control according to claim 9, wherein the gap formed between the slag breaking device (8) and the bottom of the grate (6) is designed to be 2-15 cm according to different biomass raw materials.

12. The vertical pyrolysis reactor with precise control according to claim 9 wherein when a biomass raw material is straw of less than 10 cm, the gap formed between the slag breaking device (8) and the bottom of the grate (6) is 4-8 cm.

13. The vertical pyrolysis reactor with precise control according to claim 5, wherein the gap formed between the slag breaking device (8) and the bottom of the grate (6) is designed to be 2-15 cm according to different biomass raw materials.

14. The vertical pyrolysis reactor with precise control according to claim 5, wherein when a biomass raw material is straw of less than 10 cm, the gap formed between the slag breaking device (8) and the bottom of the grate (6) is 4-8 cm.

15. The vertical pyrolysis reactor with precise control according to claim 1, wherein the ash discharging device (5) has on the bottom a sealing device for preventing gas leakage of the reactor during an ash discharging operation; and the ash discharging device (5) has a water cooling device on the outer part.

16. The vertical pyrolysis reactor with precise control according to claim 1, wherein the grate (6) is a structure having at least four grate layers, and is set to be rotatable and non-rotatable structures alternately, and a grate rotation control device (11) is mounted outside the reactor, for controlling a rotation speed of the rotatable grate layers; the feeding device (2) located outside the reactor shell (1) has an air inlet (10), and hot air enters from the air inlet (10) and is conveyed into the reactor through air holes or gaps between the grate layers.

17. The vertical pyrolysis reactor with precise control according to claim 10, wherein the gap formed between the slag breaking device (8) and the bottom of the grate (6) is designed to be 2-15 cm according to different biomass raw materials.

18. The vertical pyrolysis reactor with precise control according to claim 10, wherein when a biomass raw material is straw of less than 10 cm, the gap formed between the slag breaking device (8) and the bottom of the grate (6) is 4-8 cm.

* * * * *